(12) United States Patent
Kolberg

(10) Patent No.: US 6,581,543 B1
(45) Date of Patent: Jun. 24, 2003

(54) INNER VALVES FOR FISH CAGE

(75) Inventor: Dag Kolberg, Båsmoen (NO)

(73) Assignee: Helgeland Holding AS, Rana (NO)

( * ) Notice: Subject to any disclaimer, the term of this patent is extended or adjusted under 35 U.S.C. 154(b) by 0 days.

(21) Appl. No.: 09/959,971

(22) PCT Filed: May 30, 2000

(86) PCT No.: PCT/NO00/00184

§ 371 (c)(1), (2), (4) Date: Nov. 14, 2001

(87) PCT Pub. No.: WO00/72669

PCT Pub. Date: Dec. 7, 2000

(30) Foreign Application Priority Data

May 31, 1999 (NO) ............................................ 19992614

(51) Int. Cl.7 ................................................. A01K 61/00
(52) U.S. Cl. .......................................... 119/223; 43/102
(58) Field of Search ................................. 119/223, 208, 119/238, 239, 240; 43/102, 103, 104, 105, 100, 101; 114/333, 331, 330

(56) References Cited

U.S. PATENT DOCUMENTS 3,852,908 A * 12/1974 Christopher .................. 43/102
4,034,693 A * 7/1977 Challenger ................... 43/100
4,092,797 A * 6/1978 Azurin ......................... 43/102
4,507,093 A * 3/1985 Norvell ........................ 43/102
5,845,602 A * 12/1998 Kaarstad et al. ............. 119/223
5,967,086 A * 10/1999 Knott, Sr. .................... 119/223

FOREIGN PATENT DOCUMENTS

| GB | 2 221 824 A | * | 2/1990 | ................. 119/223 |
| JP | 03251131 A | * | 11/1991 | ................. 119/223 |
| WO | WO 96/24245 A1 | | 8/1996 | |
| WO | WO 99/34668 A1 | | 7/1999 | |

* cited by examiner

Primary Examiner—Peter M. Poon
Assistant Examiner—Joan M. Olszewski
(74) Attorney, Agent, or Firm—Rothwell, Figg, Ernst & Manbeck

(57) ABSTRACT

A fish cage having one or more air-tight buoyancy rings (1) being entirely or partially hollow, with water valves (20) for inlet and outlet of water, and air valves (3) for injection and outlet of air, and preferably with closing shot plates (2) in the buoyancy ring (1). The novel feature according to the invention is that at least one or more of the air valves (3), and preferably also the water valves (20) are arranged inside of the buoyancy ring (1) so that the air valves (3) and water valves (20) are protected from external mechanical influence.

13 Claims, 6 Drawing Sheets

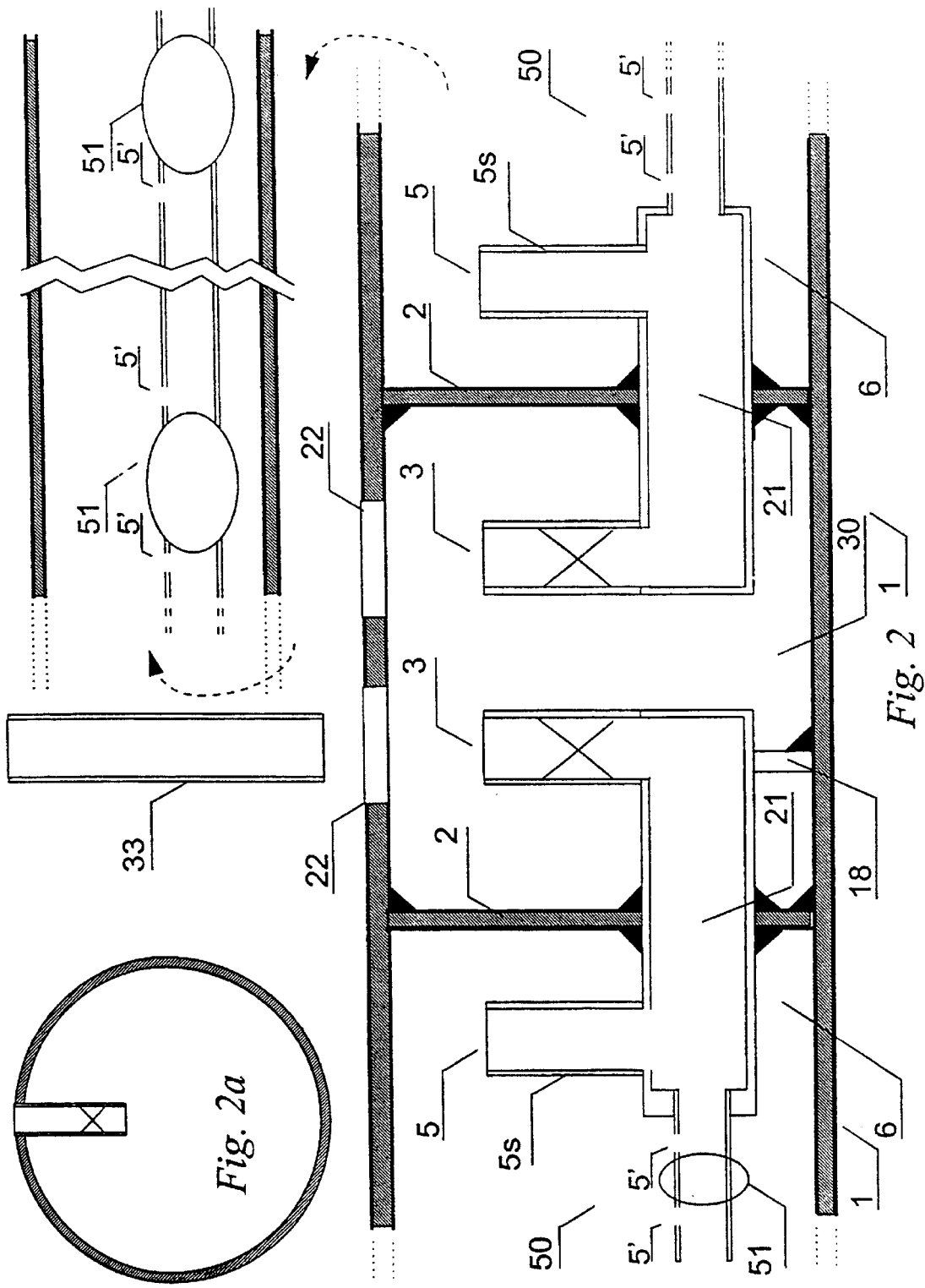

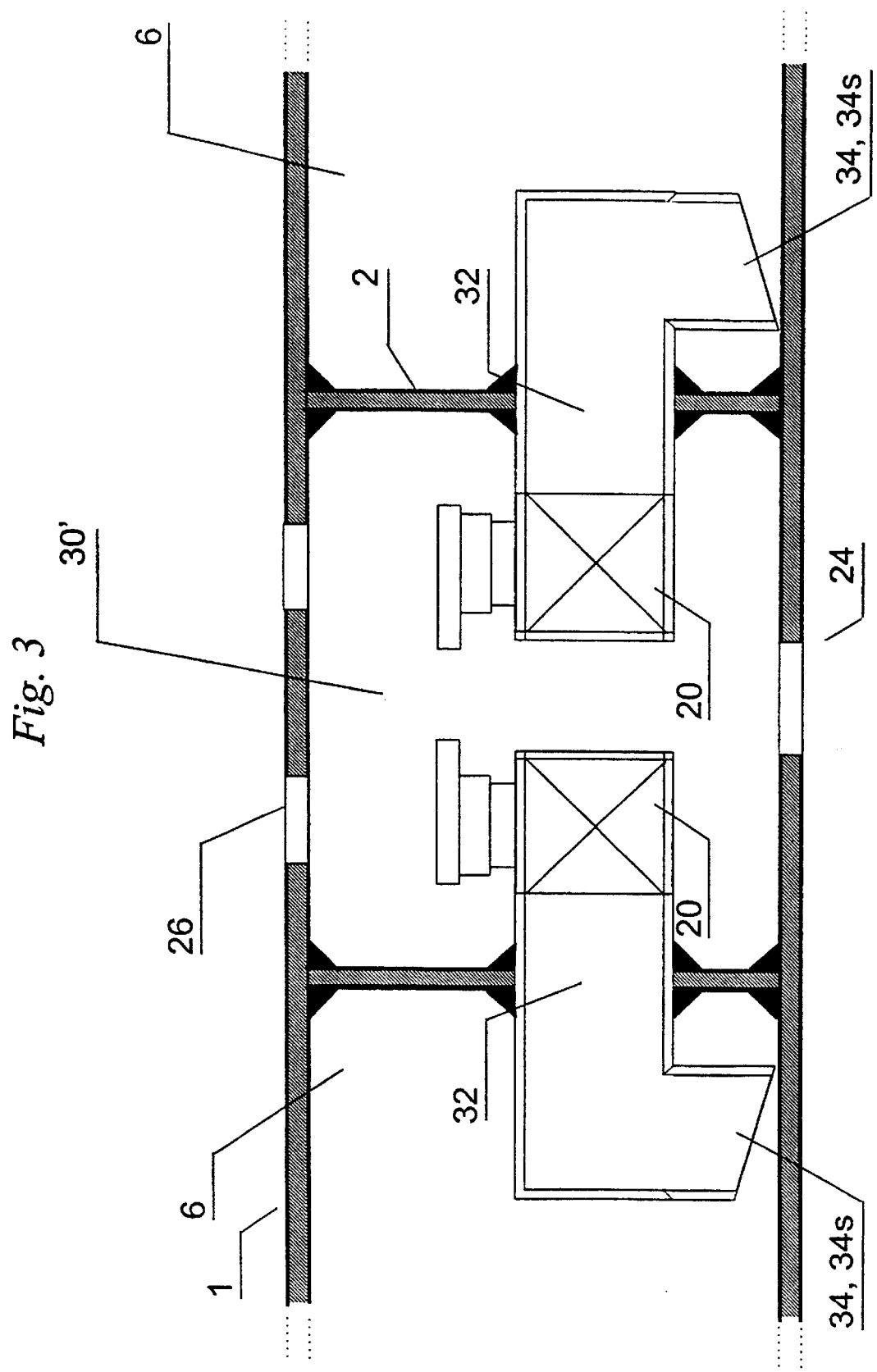

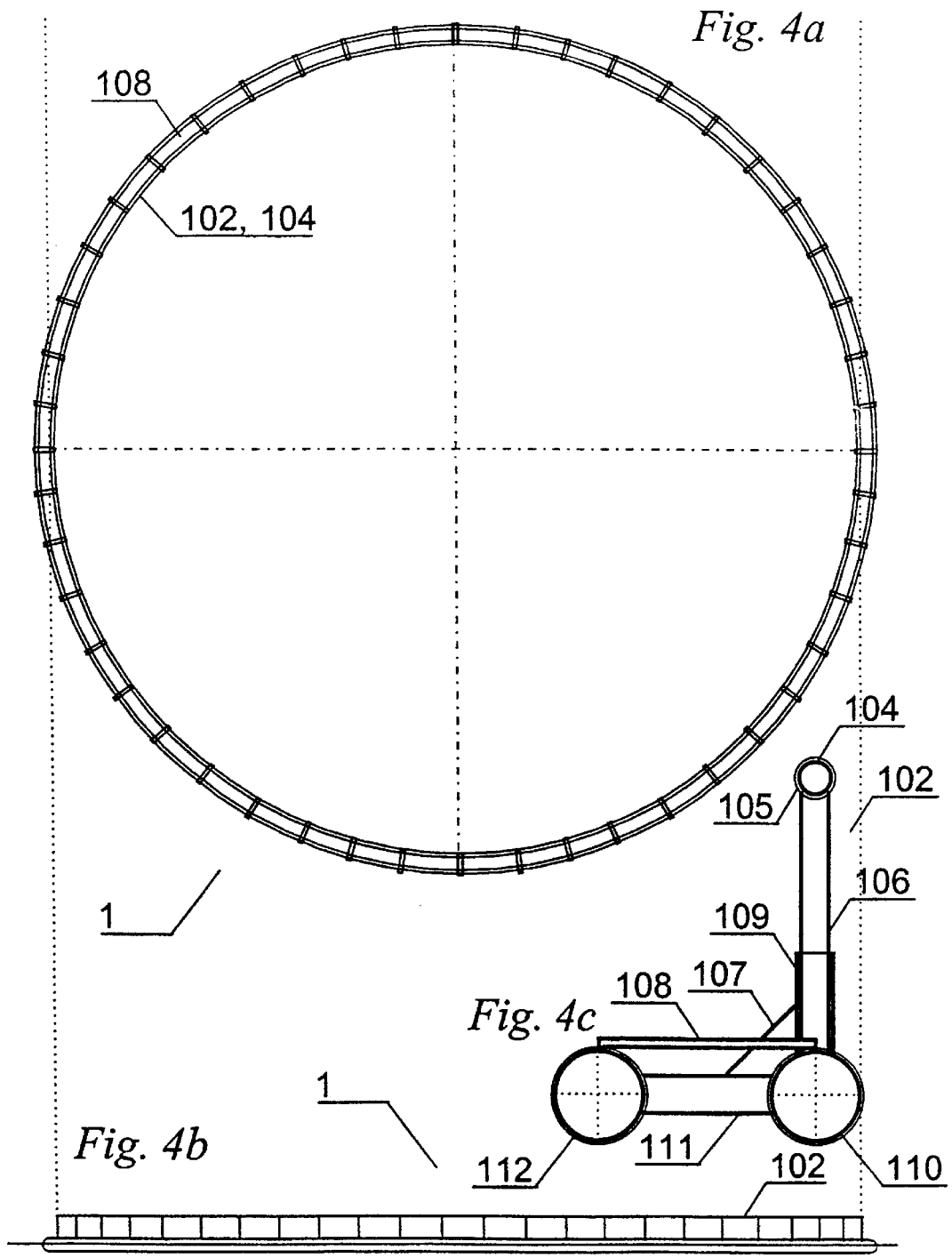

INNER VALVES FOR FISH CAGE

AREA OF APPLICATION OF THE INVENTION

The invention relates to a submersible fish cage, submersible to protect the cage and its contents of live marine organisms against undesired environmental agents as strong waves, ice formation, oil pollution and similar effects.

KNOWN ART

The applicants have since 1989 worked with developing submersible fish cages. The reason for desiring to submerge fish cages below the surface was that one experienced loss of fish fry and adult fish due to local or regional algae blooming. Ice formation on the sea surface or icing on the part of the cage construction being above the sea surface is a disadvantage. Wave action against the cages constitute a problem. On submerging the cage it will be exposed to forces being less than the forces on the sea surface. One solution is to submerge the fish cage to a level being at such a depth that the conditions are improved for the fish. The applicant has, in Norwegian patent application NO 1998.0086 "Submersible cage", filed Jan. 8, 1998, described a fish cage aranged to be submerged below the sea surface, and a method to conduct the submersion in a safe, balanced and expedient way.

NO 300 002 describes shot plates arranged in relation to the placement of a water valve in the buoyancy ring. At both sides of the shot plate air hoses are connected, being designed for both injection and exhaustion of air. Additional air hoses connected further away from the shot plate may take away air pockets during submersion.

Norwegian provisional patent NO 167 543 "Method and device to isolate the contents of a fish cage" describes among others a buoyancy system to bring an outer fish cage down and under a floating cage, by means of a buoyancy ring sectioned in separate chambers. It describes shot plates and connecting valves for air and water, later described in NO 300 002.

SHORT SUMMARY OF THE INVENTION

The solution to the above mentioned problems arising in connection with the described art, is a fish cage, with one or more air-tight buoyancy rings being entirely or partially hollow, with valves for intake and outlet for water, and injection and outlet of air, and preferrably with shot plates in the buoyancy rings. The novel feature of the invention is primarily that the air valves and preferrably also the water valves are arranged inside the buoyancy rings so that they are protected against external (mechanical) acting forces.

The fish cage's valves for connecting pressure air hoses and water valves are arranged inside the fish cage in order to make the fish cage less vulnerable to external effects.

Additional features by the invention is given in the attached subclaims.

Below is given a detailed description of a preferred embodiment of the invention, with reference to the attached drawing figures:

FIG. 2a illustrates in a simplest possibly embodiment an internally arranged valve, e.g. an air valve.

FIG. 2 shows a longitudinal section through a valve room between two buoyancy sections of a buoyancy ring, comprising air valves.

FIG. 3 illustrates a longitudinal section through a valve room between two buoyancy sections of a buoyancy ring, comprising water valves.

FIG. 4a shows a plan view of an entire buoyancy ring for a fish cage.

FIG. 4b is a side elevation view of the same buoyancy ring and illustrates in addition the handrailing.

FIG. 4c shows a vertical section of a section of the buoyancy ring with the railing and brackets between the buoyancy tubes.

DETAILED DESCRIPTION OF THE INVENTION

Figure 1A:
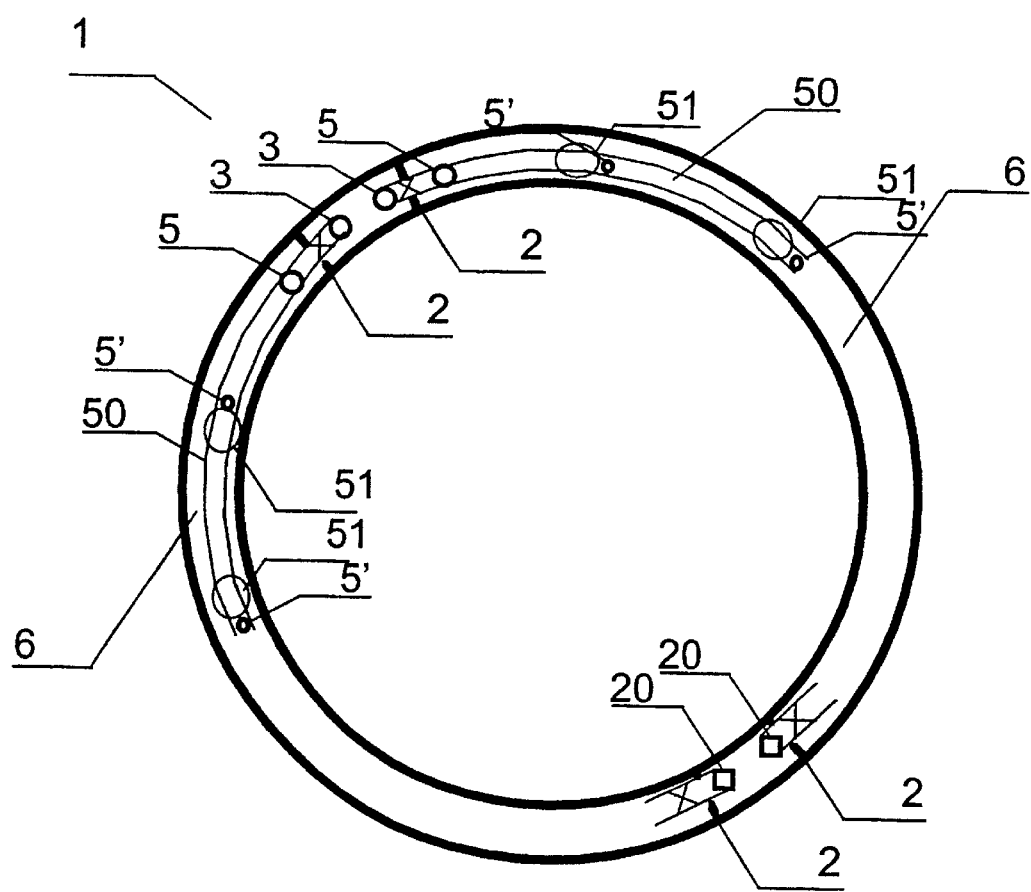
FIG. 1a shows a vertical view layout illustrating that the buoyancy ring according to the invention is provided with air valves (circle symbols) and water valves (square symbols).
Figure 1B:
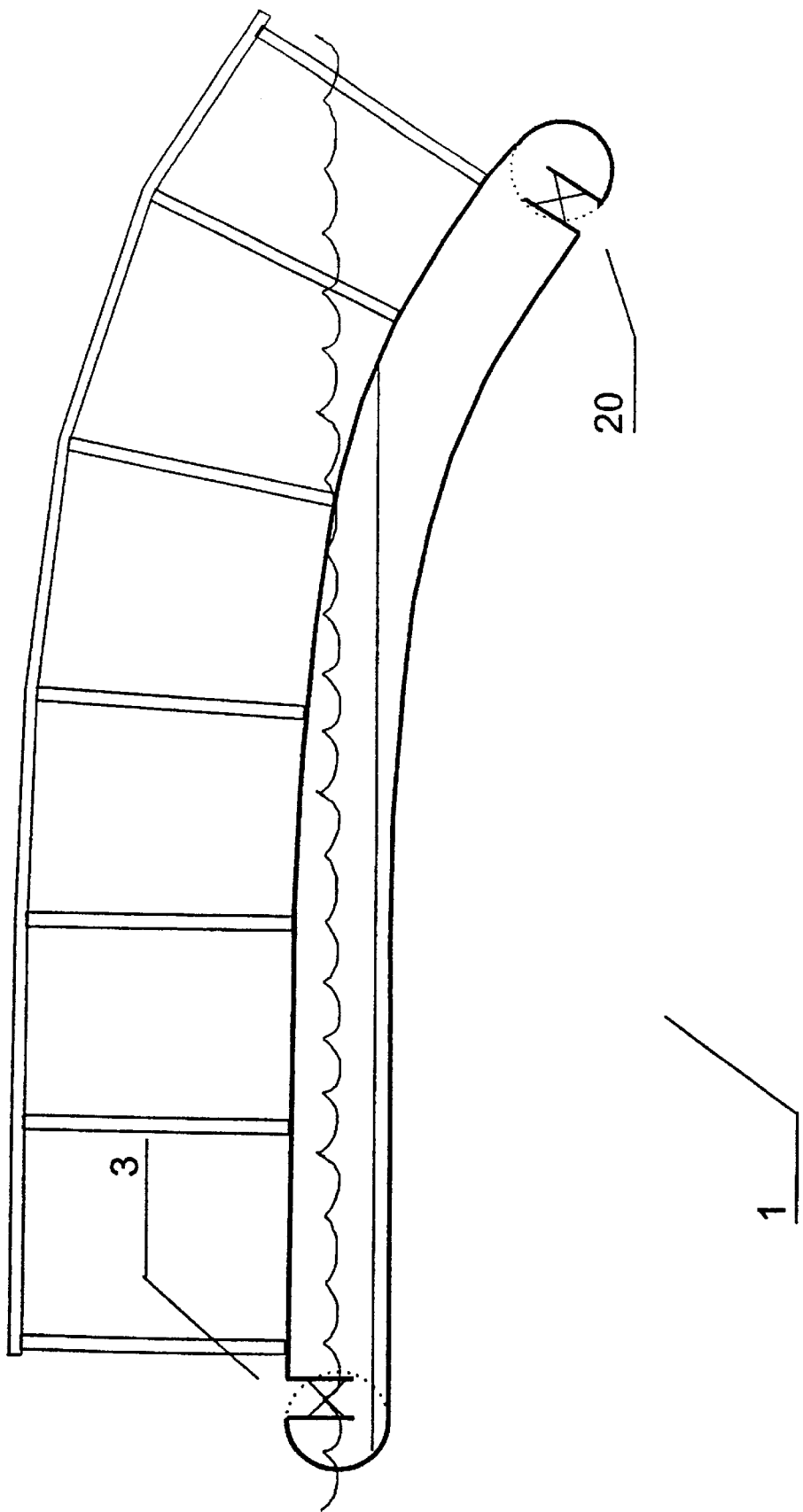
FIG. 1b is an elevation view schematically illustrating valves on the buoyancy ring lying in a partially submerged position.

FIG. 1 illustrates in plan view a principle illustration of a buoyancy ring 1 being hollow and closed towards the surroundings. The buoyancy ring shall hold up a fish net or yarn (not shown) for holding the fish inside the fish cage, and a gangway, handrailing, feeding equipment and all other necessary additional equipment. The shot plates 2 form two buoyancy sections 6 of the fish cage. A fish cage with one or more air-tight buoyancy rings 1 being entirely or partially hollow, has water valves 20 for intake and outlet of water, and air valves 3 for injection and outlet of air. The buoyancy ring has closing shot plates 2 and may have baffle plates. The novel feature of the invention is that at least one or more of the air valves 3 and preferrably also the water valves 20 are arranged inside the buoyancy ring 1 so that the air valves 3 and the water valves 20 respectively are protected against external mechanical action.

Air Valves

Figure 5:
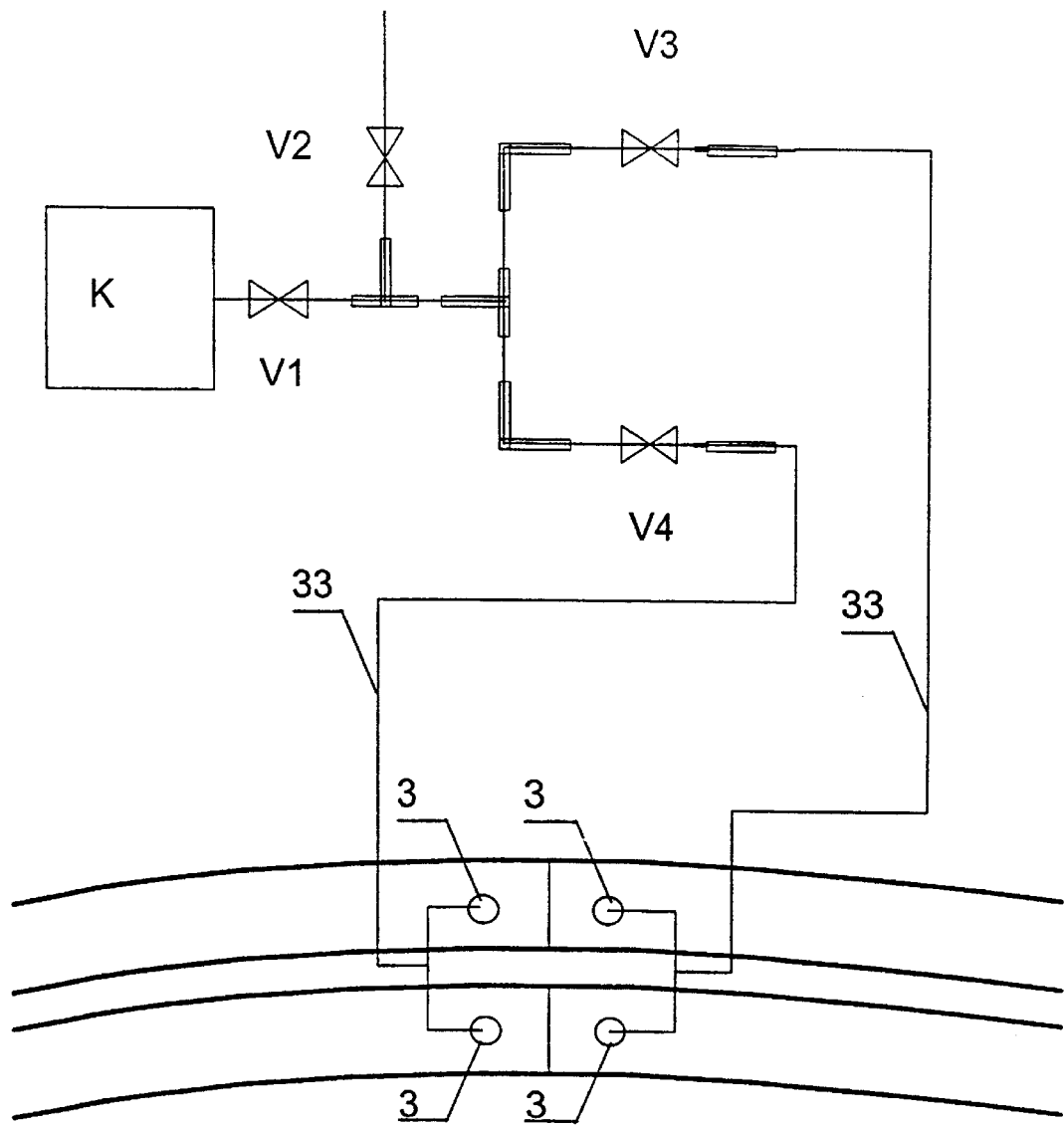
FIG. 5 illustrates a coupling diagram for pressure hoses and valves.

FIG. 2a shows a simplest possible embodiment of the invention. FIG. 1a and 2 illustrate air valves 3 for filling and release or evacuation of air. Air valve 3 belongs to the sectors 6. A preferred embodiment has at least two air valves 2, arranged near each shot plate 2 which close small valve rooms 30 for air valves 3, and valve rooms 30' for water valves 20, in the buoyancy ring 1. The shot plate 2 has an aperture 21 for guiding through the valve 3 to the buoyancy section 6. In the buoyancy 6 the valve conducts over to air opening 5 which in a preferred embodiment is directed straightly upwards with a pipe end 5s arranged to drain out air while the ring shall be evacuated of air and to be filled with water. Apertures 22 are arranged in the buoyancy ring's 1 outer skin for access for air hoses 33 from a compressor or compressed air bottles K as illustrated in FIG. 5. The air hose 33 is in a preferred embodiment provided with a rapid connector arranged for a corresponding rapid connector (not shown) in the air valve 3. An air hose 50 arranged inside the buoyancy section 6 has airing apertures 5'. Preferably the airing hose 50 is provided with floaters 51, being arranged to hold the airing apertures 5' above a possible water surface inside the buoyancy section 6. This airing hose is essential during submersion of the buoyancy ring in order to assure drainage of all air to go out, and that there are no air pockets forming near the air valve 3.

The shot plates 2 are in a preferred embodiment of 15 to 25 mm thickness and arranged closing towards the inner side of the buoyancy ring 1, with a rim at one side or either side of the shot plate.

Water Valves

For the water valve 20 we refer to FIG. 3. The water valve 20 is in a preferred embodiment, in the same manner as for the air valves 3, arranged in a corresponding valve room 30' being arranged in the buoyancy ring's outer skin and limited by shot plates 2, with apertures 24 in the outer skin of the buoyancy ring 1, and with a tight bearing of the valve 20 in an opening 32 in the shot plate 2 towards a buoyancy section 6 of the buoyancy ring 1, having arranged at least one water outlet 34 being directed mainly vertically downwards, preferrebly with a pipe end 34s inside the buoyancy section 6, so that the water valve 20 is able to drain out also all water residing at the bottom of the buoyancy section 6 near the water valve and inside the buoyancy section 6.

Apertures 26 in the buoyancy ring's 1 outer skin in the valve room 30' are arranged for access for closing and opening of the water valves 20.

Closures may be arranged in all apertures 22, 26 in the outer skin of the buoyancy ring so that algal growth inside the valve rooms 30, 30' are prevented.

General on the Buoyancy Ring(s).

In a preferred embodiment of the invention the buoyancy element 1 of the fish cage comprises two consentric hollow rings, comprising of an outer and inner tube having preferrably circular cross-section. The inner diameter for the preferred embodiment of the fish cage varies between 12 and 44 meters. The outer diameter for the corresponding embodiment varies between 13 and 46 meters. In an alternative embodiment the fish cage may comprise e.g. one single buoyancy ring, or three consentric buoyancy rings.

FIGS. 4b and 4c show a railing 102 which can hold a raised jump net (not shown) which is sufficiently high in order to prevent fish from escape by jumping out, and at the same time prevent stranger or undesired fish from jumping into the fish cage. The fish cage must have a covering net roof (not shown)when it shall be submersible, otherwise the fish would escape. The net roof must have arranged net roof floaters (not illustrated) in the center of the fish cage surface centre. The net roof is attached preferably in the jump net, and should be of the same quality and mesh size as the rest of the net in the fish cage. FIG. 4c illustrates, in section, details in the construction of clamps and stays holding each particular arc section of the buoyancy ring together. An entire cage may comprise of 20 to 80 such stays and clamps holding the two floating rings in a fixed separation and which also hold the railing 102. The cross-section diameter of the tubes constituting the outer and inner buoyancy ring is in a preferred embodiment between 20 and 40 cm. The separation between the outer and the inner floating ring may in a preferred embodiment vary between 40 and 75 cm, or designed according to the customer's specifications. The diameter of the handrail 104 on the railing 102 may be from 110 mm or more, and held by clamps 105 of diameter about 125 mm mounted at the top of tubular poles or "uprights" 106 which sit in sockets 109 attached to the inner clamping ring 110 and in an oblique stay 107 which is further attached to a horizontal stay 111 between the outer clamping ring 112 and the inner clamping ring 110. The clamping rings 110 clamp the inner buoyancy ring. The clamping rings 112 clamp the outer buoyancy ring. A gangway plate 108 is mounted according to the known art, resting on the two buoyancy rings or supported by the clamps. A unit may be made comprising two clamping rings 110, 112 connected by the horizontal stay 111 and provided with a socket 109 and gangway plate 108, and is called a "bracket". The exact dimensions of the components mentioned here are not essential to the idea of the invention, and may be arranged and applied differently within the scope of the invention.

Connection of Pressurized Air

FIG. 5 illustrates a coupling diagramme for air hoses from a compressor K to the valves 3 of the buoyancy ring 1. The valves V3 and V4 guides the balancing of the buoyancy ring during elevation and submersion. The valve V1 is opened for air supply and the valve V2 is opened for air release. The air supply may take place by means of compressed air from a compressor or from a pressurized air bottle or air container. The control of the feeding pressure take plase through a pressure regulator (not illustrated) which must be adjusted according to the maximum allowed submergence depth.

In one possible embodiment the valve rooms 30, 30' can be prefabricated as insert elements with ready joining pieces for insertion into a buoyancy ring 1.

What is claimed is:

1. A fish cage having a float collar comprising at least one hollow air-tight buoyancy rings (1), with water valves (20) for inlet and outlet of water, and air valves (3) for injection and outlet of air, characterized in that at least one of the air valves (3) are arranged internally within the hollow air-tight space defining at least one of the buoyancy rings (1) forming the float collar so that the air valves (3) are protected from external mechanical influence.

2. The fish cage according to claim 1, characterized in that the air valve (3) is arranged in a valve room (30) being arranged internally within the hollow air-tight space defining the at least one buoyancy ring and limited by partition shot plates (2), with apertures (22) in an outer skin of the buoyancy ring (1), with a tight aperture (21) for the air valve (3) through the partition shot plate (2) into a buoyancy section (6) of the buoyancy ring (1) where at least one air opening (5) is arranged from the air valve (3).

3. The fish cage according to claim 2, characterized in that the end of the air valve (3) which passes through the tight aperture (21) ends in at least one air aperture (5) directed essentially vertically upwards.

4. The fish cage according to claim 1, wherein an airing hose (50) is arranged internally within the hollow air-tight space defining the at least one buoyancy ring (1) in a buoyancy section (6), said airing hose (50) being provided with airing apertures (5').

5. The fish cage according to claim 4, characterized in that floaters (51) of the airing hose (50) are arranged on the airing hose (50) to keep the airing apertures (5') above a possible water surface inside the buoyancy section (6).

6. The fish cage according to claim 1, characterized in that the water valve (20) is arranged inside a valve room (30') being arranged internally within the hollow air-tight space defining the at least one buoyancy ring and limited by partition shot plates (2), with apertures (24) in an outer skin of the buoyancy ring (1), with a tight aperture (32) for the water valve (20) through the partition shot plate (2) into a buoyancy section (6) of the buoyancy ring (1), where a water aperture (34) is arranged from the water valve (20).

7. The fish cage according to claim 6, characterized in that at least one water aperture (34) is directed essentially vertically downwards.

8. The fish cage according to claim 7, characterized in that a pipe end (34s) of the water aperture (34) is inside the buoyancy section (6).

9. The fish cage according to claim 1, characterized by apertures (26) in an outer skin (1) of a valve room (30'), said valve room (30') being arranged internally within the hollow air-tight space defining said at least one buoyancy ring and substantially surrounding said water valves (20), said apertures being arranged for access for closing and opening of the water valves (20).

10. The fish cage according to claim 1, characterized in that there are partition shot plates (2) in the at least one buoyancy ring (1).

11. The fish cage according to claim 1, characterized in that at least one of the water valves (20) is arranged internally within the hollow air-tight space defining the buoyancy ring (1) forming the float collar so that the water valves (20) are protected from external mechanical influence.

12. The fish cage according to claim 1, characterized in that the at least one of the air-tight buoyancy ring (1) is entirely hollow.

13. The fish cage according to claim 1, characterized in that the at least one of the airtight buoyancy ring (1) is partially hollow.

* * * * *